(12) United States Patent
Musuluri

(10) Patent No.: US 9,703,874 B2
(45) Date of Patent: Jul. 11, 2017

(54) SYSTEM AND METHOD FOR PRESENTING SEARCH EXTRACT TITLE

(71) Applicant: Aravind Musuluri, Birmingham, AL (US)

(72) Inventor: Aravind Musuluri, Birmingham, AL (US)

( * ) Notice: Subject to any disclaimer, the term of this patent is extended or adjusted under 35 U.S.C. 154(b) by 259 days.

(21) Appl. No.: 14/302,448

(22) Filed: Jun. 12, 2014

(65) Prior Publication Data

US 2015/0363495 A1 Dec. 17, 2015

Related U.S. Application Data

(63) Continuation-in-part of application No. 12/897,500, filed on Oct. 4, 2010.

(60) Provisional application No. 61/247,973, filed on Oct. 2, 2009.

(51) Int. Cl.
G06F 17/30 (2006.01)
G06F 17/27 (2006.01)

(52) U.S. Cl.
CPC ...... *G06F 17/30867* (2013.01); *G06F 17/277* (2013.01); *G06F 17/3053* (2013.01); *G06F 17/30864* (2013.01)

(58) Field of Classification Search
CPC ................. G06F 17/243; G06F 17/248; G06F 17/30554; G06F 17/30696; G06F 17/30991; G06F 17/3005
USPC .................................................. 707/723, 739
See application file for complete search history.

(56) References Cited

U.S. PATENT DOCUMENTS

2011/0276874 A1* 11/2011 Dejean .................. G06F 17/243
715/243

\* cited by examiner

*Primary Examiner* — Sheree Brown

(57) ABSTRACT

System and method for providing search results are disclosed. The methods of the present disclosure relate to displaying results of a search operation comprising at least one search extract and a title to the search extract, such that, the presentation semantics of the title is different from the rest of the extract.

1 Claim, 4 Drawing Sheets

SYSTEM AND METHOD FOR PRESENTING SEARCH EXTRACT TITLE

CROSS REFERENCES

This application is a continuation-in-part of U.S. patent application Ser. No. 12/897,500, filed Oct. 4, 2010, now published as "SYSTEM AND METHOD FOR BLOCK SEGMENTING, IDENTIFYING AND INDEXING VISUAL ELEMENTS, AND SEARCHING DOCUMENTS", which claims priority benefit of U.S. Provisional Patent Application 61/247,973, filed Oct. 2, 2009, claiming priority under 35 USC 120, the entire contents of all the listed applications herein incorporated by reference in their entirety.

TECHNICAL FIELD

The present disclosure generally relates to search engine operations and method to display the results of a search operation. Particularly, the disclosure relates to improving user experience in viewing the search results and more particularly to a system and method for presenting search extract title.

BACKGROUND

The statements in this section merely provide background information related to the present disclosure and may not constitute prior art.

Search engines assist users in retrieving relevant data from data sources. The data source herein may refer to data and/or document(s) on the Internet, intranet, storage devices, and so on. In order to use a search engine, a user seeking information on a desired topic generally inputs a search query consisting of keyword(s) or phrase(s) relevant to the topic into the search interface of the search engine. Once the search query is received, the search engine identifies documents in a data source that are relevant to the search query and displays a report with a prioritized list of links pointing to relevant documents containing the search keywords.

The identified documents are typically, at the minimum, displayed as search results comprising a title, a link to the document and an extract. Known search engines like Google®, Bing®, Yahoo® etc. have provided a variety of functionalities to improve the user experience. One such functionality is a providing titles within a search result to give the user an overview of the content in the document. Such titles could be a title to the entire result. The tiles may also be for the search extract as disclosed in U.S. patent application Ser. No. 12/897,500 herein incorporated by reference. The extract title when read along with the result title gives the user a better understanding of the nature of the document. While titles provide good starting point to the user, there is a need to provide additional improvements that can further enhance user experience and allow the user to easily spot results that are relevant to his search query.

SUMMARY

The following presents a simplified summary of the disclosure in order to provide a basic understanding to the reader. This summary is not an extensive overview of the disclosure and it does not identify key/critical elements of the disclosure or delineate the scope of the disclosure. Its sole purpose is to present some concepts disclosed herein in a simplified form as a prelude to the more detailed description that is presented later.

According to the aspects illustrated herein, the present disclosure relates to a method of displaying results of a search operation, said results comprising a search extract and a title to the search extract, such that the presentation semantics of the search extract title is different from the presentation semantics of the search extract.

The presentation semantics in accordance with the present disclosure may be selected from the group comprising font size, font type, font weight, background color, foreground color, word art, text effects, text decorations, text alignment and combinations thereof.

Text effects in accordance with the present disclosure may be selected from the group comprising, but not limited to, shimmer, lights, blinking, marching ants, sparkle and combinations thereof.

Text decoration in accordance with the present disclosure is selected from the group comprising italicizing, underlining, letter spacing and combinations thereof.

Text alignment in accordance with the present disclosure may be selected from the group comprising centering, justifying, aligning towards the left and aligning towards the right.

In a preferred embodiment, the search extract title is underlined. In another preferred embodiment, the search extract title is centered with respect to the search extract. In a further preferred embodiment, the search extract title is underlined and centered with respect to the search extract.

In another aspect of the present disclosure, the disclosure relates to a method of applying presentation semantics to a title of the search extract, said method comprising, identifying a title to the search extract, identifying the display context of the search extract, setting a text alignment to the search extract title such that the text alignment of the title is different from the text alignment of the search extract.

In a preferred embodiment, the text alignment of the search extract title is centering.

In a further preferred embodiment, the disclosure related is a method of centering the title of a search extract, said method comprising, identifying a title to the search extract, computing the total width of the search extract, identifying the width of the title of the search extract, computing margins to center the title of the search extract with respect to the search extract.

In accordance with one or more preferred embodiments, a system comprising a search engine unit is provided. The search engine unit may comprise one or more logics configured to perform the functions and operations associated with the above disclosed methods.

In accordance with one or more preferred embodiments, a computer program product executable in a memory of a search engine unit is provided.

BRIEF DESCRIPTION OF THE DRAWINGS

The drawings described herein are for illustration purposes only and are not intended to limit the scope of the present disclosure in anyway. Throughout the disclosure, like elements are represented by like reference numerals, which are given by way of illustration only and thus are not limitative of the various embodiments.

Features, elements, and aspects that are referenced by the same numerals in different figures represent the same, equivalent, or similar features, elements, or aspects, in accordance with one or more embodiments.

Figure 1:
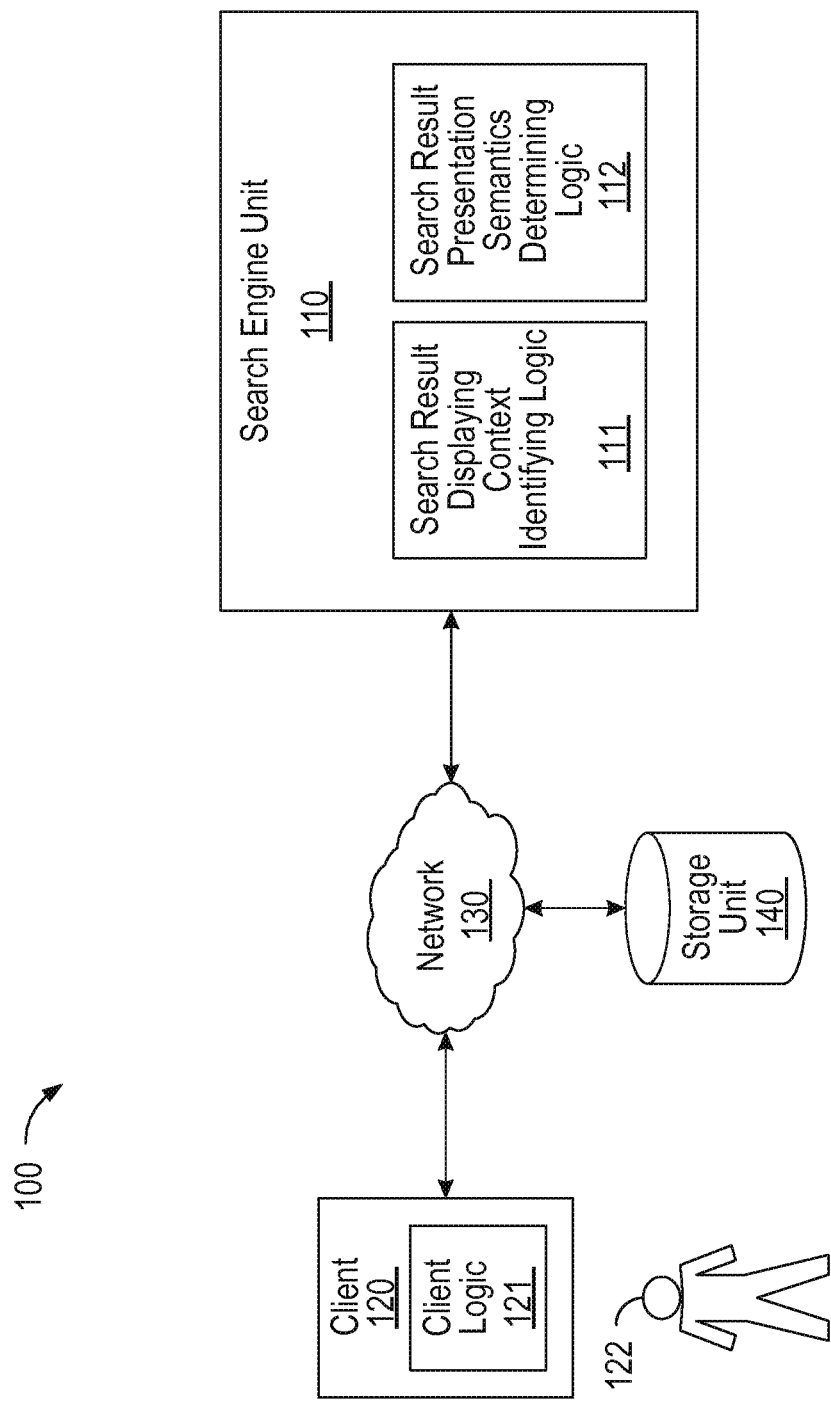

Other objectives and advantages of the present disclosure will become apparent to those skilled in the art upon reading the following detailed description of the preferred embodiments, in conjunction with the accompanying drawings, wherein:

FIG. 1 is a block diagram illustrating an exemplary search environment, in accordance with an embodiment of the present disclosure.

Figure 2:
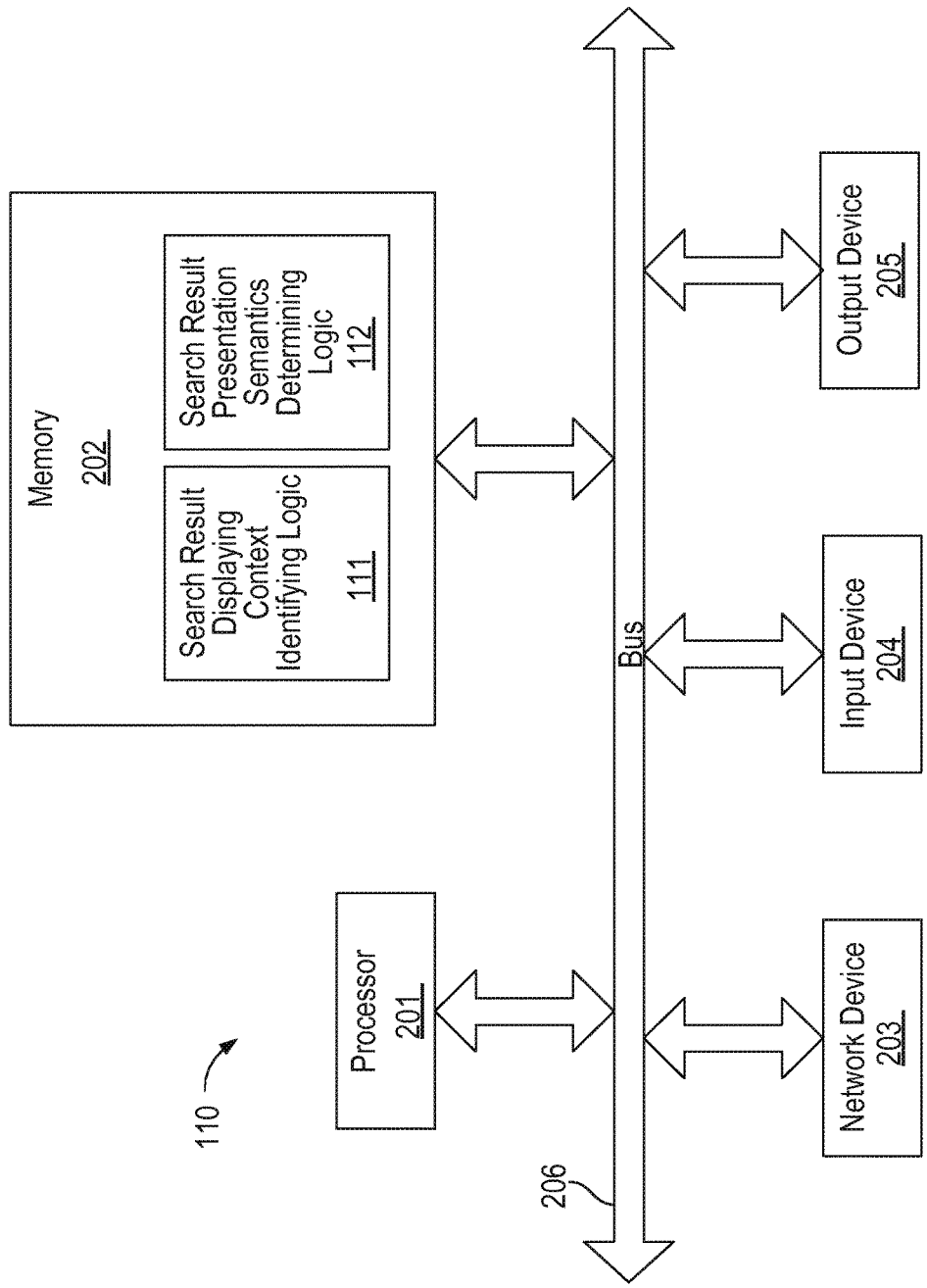

FIG. 2 is a block diagram of an exemplary computing device of FIG. 1.

Figure 3:
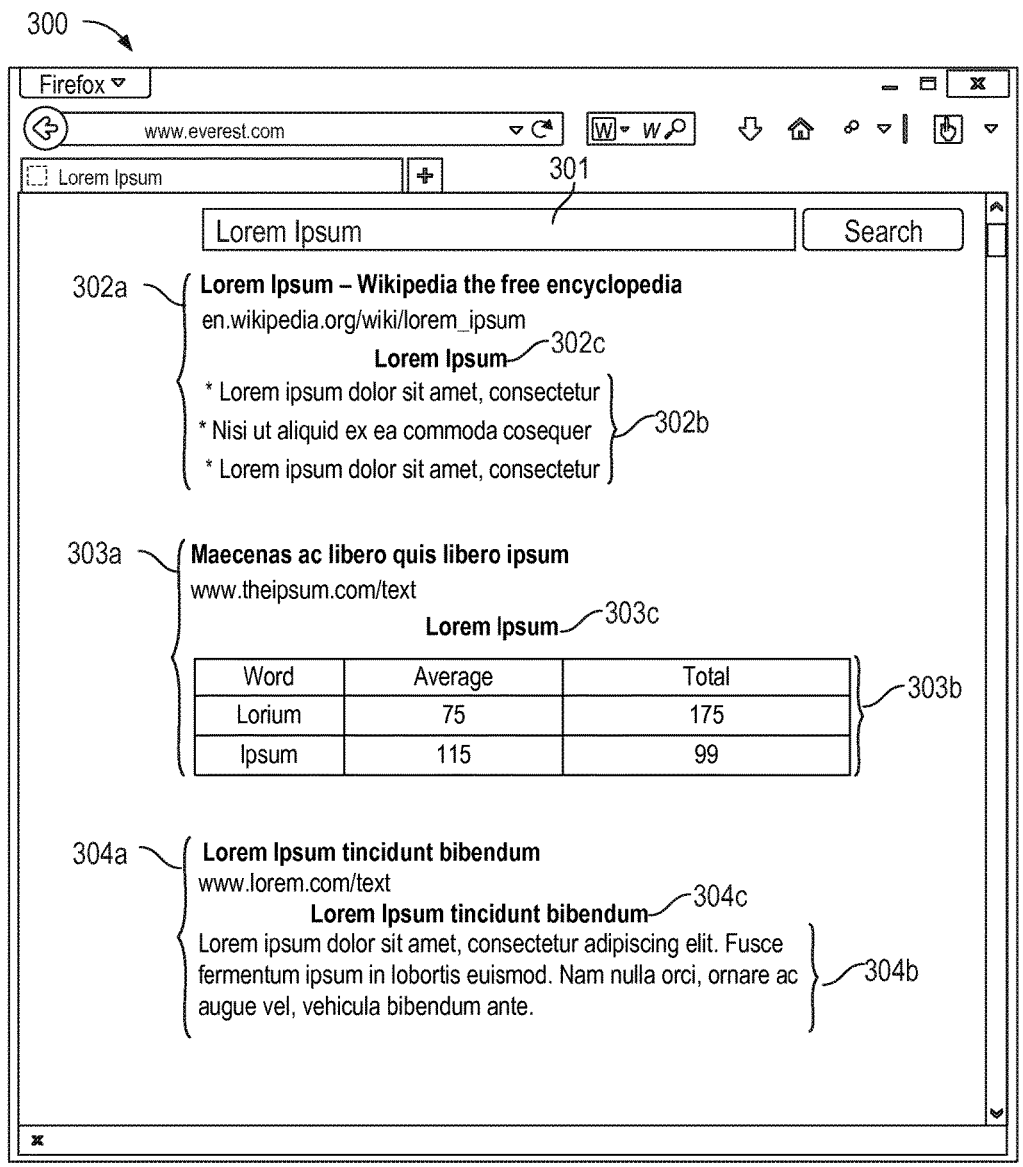

FIG. 3 depicts an exemplary search result page presented to the user by the search engine unit of FIG. 1.

Figure 4:
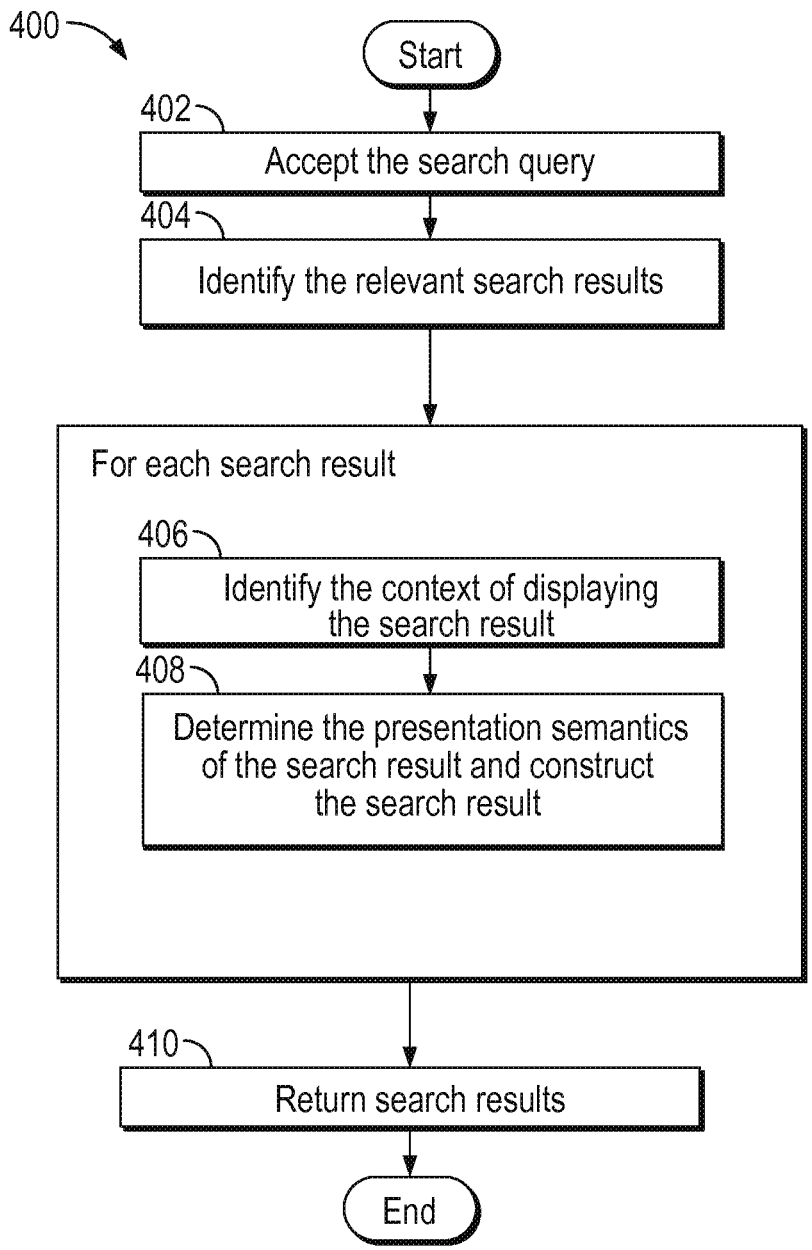

FIG. 4 is a flow diagram of a method of providing search results, in accordance with one or more preferred embodiments.

DETAILED DESCRIPTION

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of terms "first", "second", and "third", and the like, herein do not denote any order, quantity, or importance, but rather are used to distinguish one element from another.

The disclosure described here is equally applicable to searching and returning links to any document containing text and optional presentation semantics (the look and feel instructions) such as, but not limited to, HTML, DHTML, XML, SGML, PDF, E-mail, Microsoft® Word documents, Microsoft® Power point documents, news group postings, multimedia objects, Graphics Interchange Format images and/or Shockwave Flash files.

The embodiments of the present disclosure relate to a method of displaying results of a search operation comprising at least one search extract and a title to the search extract, such that the presentation semantics of the search extract title is different from the rest of the search extract.

The title as used herein through the length of this specification refers to the title of the search extract as identified by the search engine. Said titles can be identified by methods disclosed in U.S. patent application Ser. No. 12/897,500 herein incorporated by reference.

A search extract in accordance with the present disclosure includes one or more snippets extracted from portions of a document that are relevant to user's search query as determined by the search engine.

The presentation semantics may be applied by setting the font size, font type, font weight, foreground color, background color, word art, text effects, text decorations, text alignment, and combinations thereof to the title based on the search extract. The presentation semantics may also be applied based on the visual element(s) in the search extract.

Visual elements in accordance with the present disclosure includes vision-based elements in a document, selected from, but not limited to, paragraph, table, list, menu, fixed width text, key/value, graph/chart, question/answer, timeline, and interactive data.

In a preferred embodiment, the presentation semantics are applied uniformly to the titles of all extracts in the search result page.

In one embodiment of the present disclosure, the title may be italicized, underlined, spaced and combinations thereof. In a preferred embodiment, the title may be underlined.

In another embodiment, the titles may be aligned with respect to the extract. The alignment includes but not limited to left alignment, right alignment, justified or centered with respect to the search extract. In a preferred embodiment, the title may be centered.

In another preferred embodiment, the title may be underlined and centered. The title hence appears visually different from the rest of the extract and hence readily catches user attention for the user to determine relevancy of the search results.

In another method, the disclosure relates to, identifying a title to the search extract, identifying the display context of the extract, setting a text alignment to the title such that the text alignment of the title is different from the search extract.

Identifying the display context with respect to the present disclosure includes identifying the dimensions and/or position of the extract and the extract title.

The alignment includes but not limited to left alignment, right alignment, justified or centered with respect to the search extract.

In another preferred embodiment, a method of centering the title of a search extract, said method comprising, identifying a title to the search extract, computing the total width of the search extract, computing the width of the title, computing margins to center the title with respect to the search extract.

FIG. 1 is an exemplary search environment 100 in accordance with the present disclosure. It will be understood and appreciated by those of ordinary skill in the art that the computing system architecture 100 shown in FIG. 1 is merely an example of one suitable computing system and is not intended to suggest any limitation as to the scope of use or functionality of the present disclosure. Neither should the computing system architecture 100 be interpreted as having any dependency or requirement related to any single module/component or combination of modules/components illustrated therein.

The system 100 comprises a search engine unit 110, a client 120 and a storage unit 140. The search engine unit 110, the client 120 and the storage unit 140 all communicate over a network 130.

The network 130 can include any type of network known in the art or future-developed. In this regard, the network 104 may be an Ethernet, a local area network (LAN), or a wide area network (WAN), e.g., the Internet, or a combination of networks.

The search engine unit 110 may be a dedicated or a shared server. The search engine unit 110 and the client 120 may include, but are not limited to, a computer, handheld unit, mobile unit, consumer electronic unit, or the like.

The exemplary search engine unit 110 comprises a search result displaying context identifying logic 111 and a search result presentation semantics determining logic 112. The search result displaying context identifying logic 111 may be configured to identify a display context for at least one search result. The display context may include the dimensions and/or position of the search extract and the search extract title.

The search result presentation semantics determining logic 112 may be configured to identify the presentation semantics of the search results.

In one exemplary embodiment, the search result displaying context identifying logic 111 may be configured to identify the width of the search extract and the width of the search extract title. The search result presentation semantics determining logic 112 may be configured to compute the margins of the search extract title from the widths computed by the search result displaying context identifying logic 111 to align the title with respect to the search extract. For example, the search result presentation semantics logic 112 may center the title with respect to the search extract. The search result presentation semantics logic 112 sets the margin of the search extract title such that, if the width of the search extract is greater than that to the search extract title, the difference between the width of the search and the width of the search extract title is distributed equally to the left and right of the search extract title i.e. the search extract title is centered with respect to the search extract.

The storage unit 140 is configured to store information associated with search results, titles, or the like. In various embodiments, such information may include, without limitation, domains, URLs, webpages, websites, titles, visual elements, indexes, information associated therewith, and the like. In embodiments, the storage unit 140 is configured to be searchable for one or more of the items stored in association therewith. It will be understood and appreciated by those of ordinary skill in the art that the information stored in association with the storage unit 140 may be configurable and may include any information relevant to search results or the like. The content and volume of such information are not intended to limit the scope of embodiments of the present disclosure in any way. Further, though illustrated as a single, independent component, the storage unit 140 may, in fact, be a plurality of storage units, for instance a database cluster, portions of which may reside on the search engine unit 110, the client 120, another external computing device (not shown), and/or any combination thereof. Moreover, the storage unit 140 may be included within the search engine unit 110 or client 120 as a computer-storage medium. The single unit depictions are meant for clarity, not to limit the scope of embodiments in any form.

A user 122 through the client logic 121 on the client 120 may enter a search query consisting of keyword(s) which may identify the type of information that the user is interested in retrieving. The client logic 121 may comprise, for example, an Internet browser; however, other types of client logic 121 for interfacing with the user 122 and for communicating with the search engine unit 110 may be used in other embodiments of the present disclosure. The client logic 121 transmits the user search query to the search engine unit 110 via the network 130. Upon receiving the user search query the search engine unit 110 examines the storage unit 140 and compiles a prioritized list of documents containing all or some of the keyword(s) and returns the search results to the client logic 121 which may display the results to the user 122 in a window.

FIG. 2 is an exemplary search engine unit 110 in accordance with the present disclosure. It should be noted, however, that embodiments are not limited to implementation on such computing devices, but may be implemented on any of a variety of different types of computing units within the scope of embodiments hereof. The search engine unit 110 (as shown in FIG. 1) is only one example of a suitable computing/search environment and it is not intended to suggest any limitation as to the scope of use or functionality of the disclosure.

In some embodiments, the search engine unit 110 may include a bus 206, a processor 201, memory 202, network device 203, input device 204, and an output device 205. Bus 206 may include a path that permits communication among the components of the search engine unit 110.

The memory 202 stores the search result displaying context identifying logic 111 and the search result presentation semantics determining logic 112 as software in memory 202.

The memory 202 may be any type of computer memory known in the art or future-developed for electronically storing data and/or logic, including volatile and non-volatile memory. In this regard, memory 202 can include random access memory (RAM), read-only memory (ROM), flash memory, any magnetic computer storage unit, including hard disks, floppy discs, or magnetic tapes, and optical discs.

The processor 201 comprises processing hardware for interpreting or executing tasks or instructions stored in memory 202. Note that the processor 201 may be a microprocessor, a digital processor, or other type of circuitry configured to run and/or execute instructions.

The network device 203 may be any type of network unit (e.g., a modem) known in the art or future-developed for communicating over a network 130 (FIG. 1). In this regard, the search engine unit 110 (FIG. 1) communicates with the storage unit 140 (FIG. 1) and the client 120 (FIG. 1) over the network 130 (FIG. 1) via the network device 203.

The input device 204 is any type of input unit known in the art or future-developed for receiving data. As an example, the input unit 204 may be a keyboard, a mouse, a touch screen, a serial port, a scanner, a camera, or a microphone.

The output device 205 may be any type of output unit known in the art or future-developed for displaying or outputting data. As an example, the output device 205 may be a liquid crystal display (LCD) or other type of video display unit, a speaker, or a printer.

Note that the disclosure may also be practiced in a distributed computing environment where tasks or instructions of search engine unit 110 (FIG. 1) are performed by multiple computing units communicatively coupled to the network.

Further note that, the search engine unit 110 (FIG. 1) components may be implemented by software, hardware, firmware or any combination thereof. In the exemplary search engine unit 206, depicted by FIG. 1, all the components are implemented by software and stored in memory 202.

FIG. 3 depicts an exemplary search result page in accordance with the present disclosure. For a user query 301, the search engine returns a set of search results 302a, 303a and 304a comprising search extracts 302b, 303b and 304b. Each of the search extract further comprises a title 302c, 303c and 304c respectively. In accordance with the methods of the present disclosure, the search title 302c, 303c and 304c are centered with respect to their respective search extracts 302b, 303b and 304b.

FIG. 4 is a flow chart illustrating one method in accordance with present disclosure. In step 402, the search engine unit 110 (FIG. 1) may accept the search query comprising keyword(s)/search term(s) and find the relevant search results 404. For each relevant search result, the search result displaying context identifying logic 111 (FIG. 1) in step 406, may identify the context in which the search extracts and their titles are displayed to the user 122 (FIG. 1). Further, in step 408, the search result presentation semantics determining logic 112 (FIG. 1) may determine the presentation semantics for the title of each search extract and construct the displayable format of the search result such that the title is centered with respect to the corresponding search extract. In step 410, the search results are returned.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method executable on a computing device comprising a processor, memory and a storage unit to display the results of a search operation on at least one data source comprising documents, said method comprising:

(a) Accepting a search query comprising keyword(s) from a user;
(b) Generating search results by identifying documents comprising the keyword(s) in response to the search query;
(c) Identifying search results comprising the keyword(s) within a visual element in the documents;
(d) Identifying titles for the visual elements;
(e) For each identified search result, constructing the search result comprising of a search extract from a relevant portion of the visual element and a search extract title comprising of the visual element title;
(f) Computing widths of the search extract and the search extract title of the search result;
(g) Computing margins to center the search extract title with respect to the search extract of the search result and applying the margins to the search extract title of the search result;
(h) Returning a search result page comprising the search results.

* * * * *